(12) United States Patent
Metaverso

(10) Patent No.: US 9,902,091 B2
(45) Date of Patent: Feb. 27, 2018

(54) COMPOSITE BONDING TOOL WITH HIGH THERMAL CONDUCTIVITY AND LOW COEFFICIENT OF THERMAL EXPANSION

(71) Applicant: Rohr, Inc., Chula Vista, CA (US)

(72) Inventor: Kristofer Metaverso, Upland, CA (US)

(73) Assignee: ROHR, INC., Chula Vista, CA (US)

( * ) Notice: Subject to any disclaimer, the term of this patent is extended or adjusted under 35 U.S.C. 154(b) by 191 days.

(21) Appl. No.: 14/691,914

(22) Filed: Apr. 21, 2015

(65) Prior Publication Data
US 2016/0311133 A1 Oct. 27, 2016

(51) Int. Cl.
| | |
|---|---|
| C09K 5/00 | (2006.01) |
| B32B 9/00 | (2006.01) |
| D02G 3/00 | (2006.01) |
| B29C 33/38 | (2006.01) |
| C08K 13/04 | (2006.01) |
| C08K 7/04 | (2006.01) |
| C08K 9/02 | (2006.01) |
| B29L 31/00 | (2006.01) |

(52) U.S. Cl.
CPC ...... *B29C 33/3828* (2013.01); *B29C 33/3807* (2013.01); *C08K 7/04* (2013.01); *C08K 9/02* (2013.01); *C08K 13/04* (2013.01); *B29K 2907/04* (2013.01); *B29K 2995/0012* (2013.01); *B29K 2995/0013* (2013.01); *B29L 2031/757* (2013.01)

(58) Field of Classification Search
CPC . B21D 37/20; C08K 7/04; C08K 7/02; C08K 9/02; C08K 13/04; Y10T 29/49801
USPC ............ 252/75; 524/439, 404; 428/367, 370
See application file for complete search history.

(56) References Cited

U.S. PATENT DOCUMENTS

| | | | | | |
|---|---|---|---|---|---|
| 3,125,974 | A | * | 3/1964 | Toulmin, Jr. ........... | B21D 37/20 249/134 |
| 3,674,689 | A | * | 7/1972 | Giltrow .................... | C10M 7/00 428/298.7 |
| 4,511,663 | A | * | 4/1985 | Taylor .................. | C03C 14/002 264/DIG. 19 |

(Continued)

FOREIGN PATENT DOCUMENTS

CN 102978543 A 3/2013

OTHER PUBLICATIONS

Article entitled Increasing the Thorough-Thickness Thermal Conductivity of Carbon Fiber Poymer-Matrix Composite by Curing Pressure Increase and Filler Incorporation, by Seungjin Han and D.D.L. Chung, in Composites Science and Technology 71 (2011), pp. 1944-1952.

(Continued)

*Primary Examiner* — Jane L Stanley
(74) *Attorney, Agent, or Firm* — Snell & Wilmer, L.L.P.

(57) ABSTRACT

A composite bonding tool may comprise a mold surface made from a composite material including a fibrous material and a matrix disposed about the fibrous material. The resin may be cured and have a thermal conductivity greater than about 10 watts per meter Kelvin. The fibrous material may be further metal coated or plated to increase thermal conductivity. Carbon nanomaterials may be added to the matrix or onto the surface of the fibrous material in order to further enhance thermal conductivity. The mold surface has a relatively high thermal conductivity and relatively low coefficient of thermal expansion, and a relatively low mass.

15 Claims, 2 Drawing Sheets

(56) References Cited

U.S. PATENT DOCUMENTS

| | | | | |
|---|---|---|---|---|
| 5,073,589 | A * | 12/1991 | Milovich | C08K 7/04 |
| | | | | 524/439 |
| 5,746,553 | A * | 5/1998 | Engwall | B23Q 3/086 |
| | | | | 156/245 |
| 6,652,958 | B2 * | 11/2003 | Tobita | C08K 9/02 |
| | | | | 257/E23.107 |
| 8,936,695 | B2 * | 1/2015 | Rotter | B29C 70/382 |
| | | | | 100/269.02 |
| 2008/0241296 | A1 * | 10/2008 | Wang | B29C 33/38 |
| | | | | 425/130 |
| 2010/0062099 | A1 * | 3/2010 | Funke | B29C 33/02 |
| | | | | 425/446 |
| 2011/0040007 | A1 * | 2/2011 | Chandrasekhar | H01B 1/22 |
| | | | | 524/404 |

OTHER PUBLICATIONS

Article entitled "Inexpensive "Nanoglue" Can Bond Nearly Anything Together," dated May 16, 2007 in Rensselaer Polytechnic Institute News Letter, 3 pages.

* cited by examiner

COMPOSITE BONDING TOOL WITH HIGH THERMAL CONDUCTIVITY AND LOW COEFFICIENT OF THERMAL EXPANSION

FIELD OF INVENTION

The present disclosure relates to bonding tools for use in autoclaves, and, more specifically, to a composite bonding tool with a high thermal conductivity and low coefficient of thermal expansion.

BACKGROUND

Tooling systems for composite manufacturing may include surfaces for bonding composites in an autoclave or oven. In the autoclave, the bonding tool and the part to be cured are brought up to the curing temperature required to cure the matrix or resin. The tool must be designed so that its tool surface provides the desired part shape or mold surface profile at the bonding temperature. The thermal expansion of the bonding tool must be taken into account. If the tool has a low coefficient of thermal expansion (CTE), then it will be easier to machine the tool at its ambient temperature and ensure the proper mold surface profile in its thermally expanded state at the bonding temperature. Also, a low CTE of the bonding tool can contribute to preventing spring back in the cured part. Thus, a low CTE is generally recognized as desirable for a composite bonding tool to be used in an autoclave or oven.

A bonding tool with either of or a combination of a low thermal conductivity and a high mass is general undesirable. Low thermal conductivity and/or a high mass contribute to a low heating rate. The bonding tool must be relatively uniformly heated in the autoclave or oven to avoid part distortions and potential spring back. If the heat rate is low, then the autoclave or oven must be brought to the curing temperature slowly, which contributes to a long cycle time for the cure. Thus, a high heat rate achieved by high thermal conductivity and/or low mass is also recognized as generally desirable for a composite bonding tool.

Bonding tools may be made from nickel-iron based alloys, such as the nickel-iron alloy available under the trade name INVAR. Advantageously, the nickel-iron alloys may have a low CTE and are relatively durable. However, they also have a relatively low thermal conductivity when compared to other metals, and they are heavy in addition to being relatively difficult to machine.

Metal matrix composites, ceramics, and sintered materials have each been proposed as materials to form composite bonding tools with properties different from, and in some cases more advantageous than nickel-iron based alloys. However, each one also suffers from certain drawbacks such as durability and cost. A new, improved material for forming a composite bonding tool with a low CTE, and a high heat rate (through low mass and/or high thermal conductivity) is desired.

SUMMARY

A composite bonding tool may comprise a composite surface including a fibrous material to reinforce the composite bonding tool, and a resin disposed about the fibrous material. The resin may be cured and have a thermal conductivity greater than 10 watts per meter Kelvin.

In various embodiments, the resin may have thermal conductivity from 20 to 50 watts per meter Kelvin. The fibrous material may comprise a chopped fiber. The fibrous material may also include a metal coated fiber. The fibrous material may also include a nanostructure coated fiber. A nanostructure may be disposed in the resin. The nanostructure may comprise at least one of carbon nanotubes, carbon nanofibers, or graphene nanoplatelets. The resin may further comprise closed ring geometry. The fibrous material may be distributed isotropically within the resin. The resin may be formed using at least one of phenol, imidazole, or high thermal conductivity ceramic or carbon.

A composite bonding tool surface may comprise a fibrous material and a resin disposed about and infiltrating the fibrous material. The composite bonding tool surface may have a thermal conductivity from 20 to 50 watts per meter Kelvin.

In various embodiments, the fibrous material may comprise a metal coated fiber. The resin may also be formed using at least one of phenol, imidazole, or high thermal conductivity ceramic or carbon. The resin may comprise a lower coefficient of thermal expansion than glass. A thermal conductivity of the resin may be greater than 10 watts per meter Kelvin.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step.

Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

The composite materials described herein for a composite bonding tool exhibit a desirable combination of a high thermal conductivity (TC) and a low coefficient of thermal expansion (CTE). The desired TC and CTE may be achieved in the composite material through the proper selection of the fibrous material and the resin which complement each other.

Figure 1:
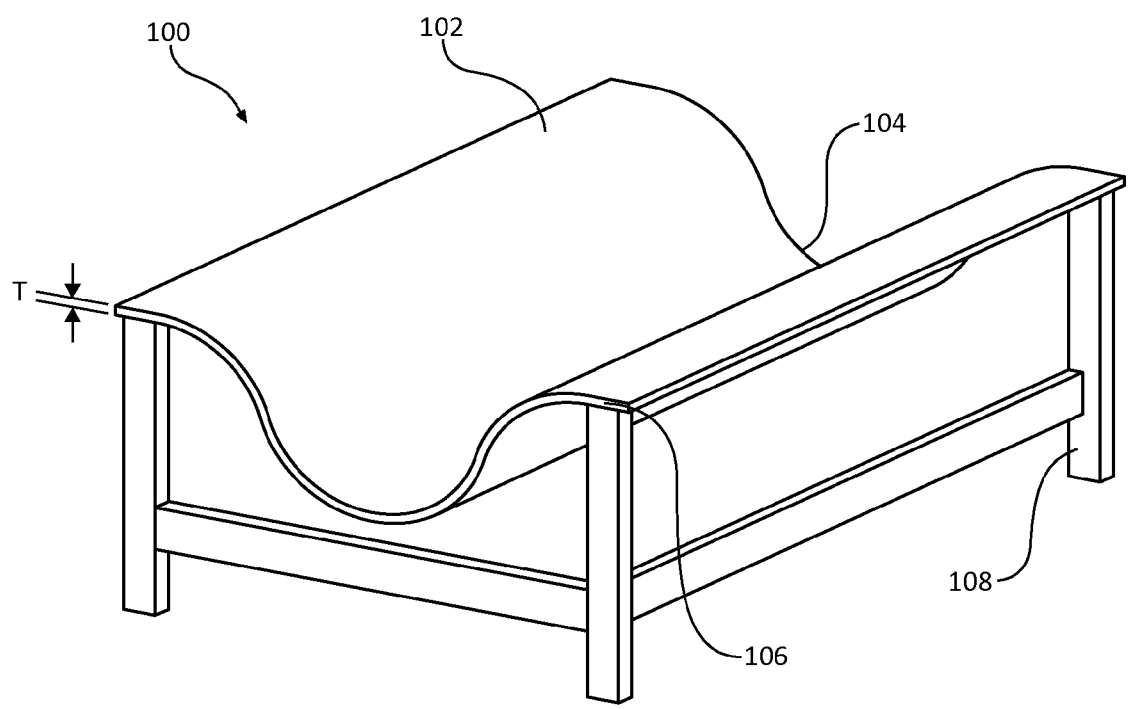
FIG. 1 illustrates a bonding tool with a composite bonding surface, in accordance with various embodiments.

With reference to FIG. 1, a bonding tool 100 with a composite mold 102 having layup surface 104 is shown, in accordance with various embodiments. Composite mold 102 may include a layup surface 104 with a contour in the shape of a part to be produced. Supports 108 may provide support for bonding tool 100. Composite mold 102 may have a sidewall 106 of thickness T. Composite mold 102 may have a substantially uniform thickness such that the thickness of composite mold 102 at any point may be approximately equal to thickness T. Thickness T may be a thickness from one half inch (1.3 cm) to six inches (15.2 cm). For example, thickness T may be approximately one inch (2.5 cm).

Figure 2:
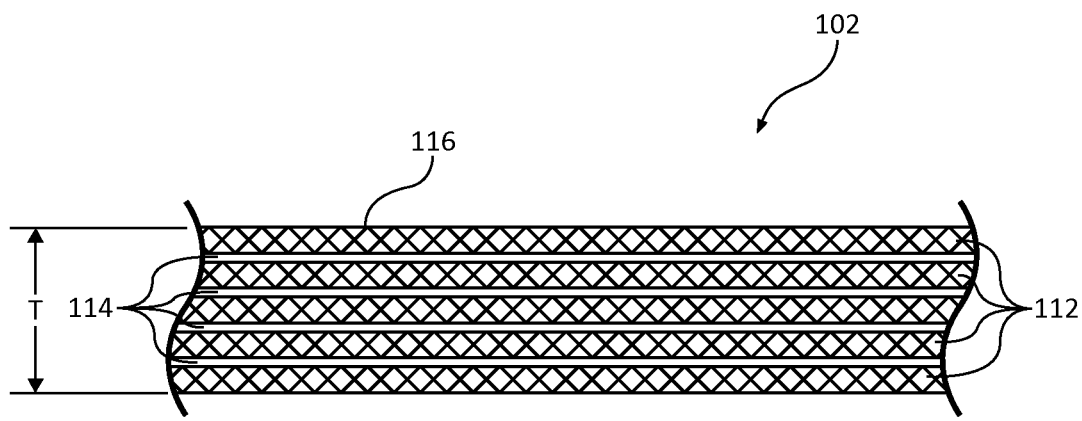
FIG. 2 illustrates a laminar composite material comprising fiber and a resin matrix, in accordance with various embodiments.
Figure 3:
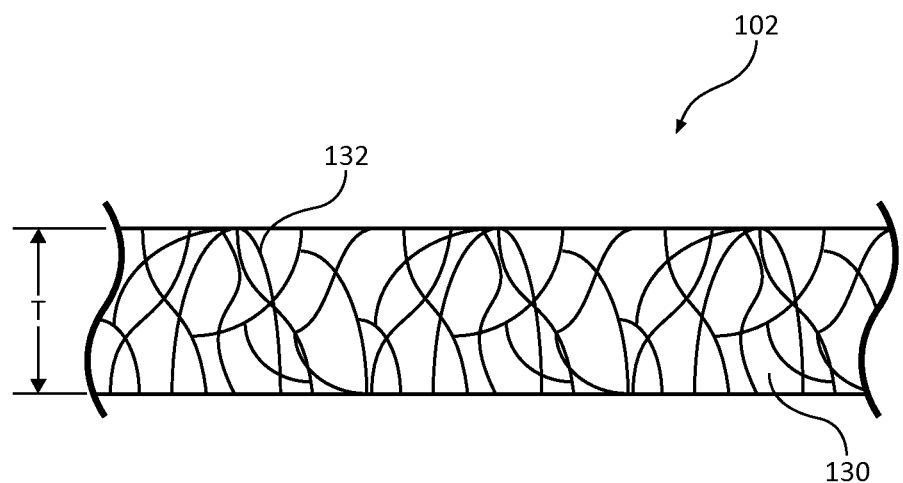
FIG. 3 illustrates a composite material comprising chopped fiber in an isotropic configuration, in accordance with various embodiments.

With reference to FIG. 2, matrix 114 and composite mold 102 may comprise a laminar structure with layers of matrix 114 and fibrous reinforcing material 112. The laminar structure may result from laying up layers of fabric (woven or non-woven) that are pre-infused with the matrix 114, or infusing the matrix into the fabric during curing. Fibrous material 112 may be woven in 3-D, 2.5-D, plain weave, and/or braided fabric configurations. A 3-D or 2.5-D configuration may have fibers oriented in three orthogonal directions. Alternatively, with reference to FIG. 3, composite mold 102 may also comprise a non-laminar structure which could be formed using chopped fibrous material 112 incorporated into matrix 114 which could be molded into the mold shape. Likewise, a non-laminar structure may be formed from tows of the fibrous material 112 that are laid-up and pre-infused with the matrix 114, or infused with the matrix 114 during curing.

Fibrous material 112 may comprise one or more of glass, aramid, boron, silicon carbon or other fibers. Fibrous material 112 adds strength and toughness to the matrix 114. To improve through thickness TC, fibrous material 112 may also be coated with an outer metallic layer formed from one or a combination of aluminum, copper, nickel, a nickel-iron alloy, or any other suitable metal.

In various embodiments, the composite structure formed by the fibrous material 112 and matrix 114 may be enhanced with nanomaterials. Nanomaterials may be grown on the fibrous material 112 or distributed in matrix 114. The nanomaterials may reinforce the matrix 114 and improve durability of the composite mold 102 over numerous heat cycles. The nanomaterials may have a high TC and low CTE consistent with the desired characteristics of composite mold 102. The nanomaterials may also protect matrix 114 from degradation through mechanisms such as micro-cracking at high temperatures in an operating environment such as an autoclave. Additionally, the nanomaterials may increase the TC of composite mold 102.

In various embodiments, the nanomaterials may comprise nanostructures including at least one of carbon nanotubes, carbon nanofibers, graphene nanoplatelets, or other graphene structures. In various embodiments, the nanomaterials may be grown on fibrous material 112 in a known manner, after it has been metal plated or coated, as applicable. The matrix 114 may then be incorporated with the fibrous material 112 after the nanomaterials are grown on the fibers.

However, in various embodiments, the nanomaterials may be dispersed throughout matrix 114. The nanomaterials may be added to the matrix 114 via a variety of methods. For example, the nanomaterials may be added to a liquid resin and evenly dispersed therein, and then the resin may be extruded into a film comprising the nanomaterials. In various embodiments, the nanomaterials may be mixed in a solvent, such as alcohol or acetone. The solvent may be added to a resin, and the mixture may be preimpregnated into the carbon fabric and fill the spaces between individual fibers within the fabric. In various embodiments, both the grown-on nanomaterials on the fibrous material 114 and the distributed nanomaterials in the matrix 112 may be present in the composite mold 102. The integrated nanomaterials in composite mold 102 may increase the TC of composite mold 102. In that regard, a matrix 114 having low TC may be used in combination with fibrous material 112 with nanomaterials to achieve composite mold 102 with a high TC and low CTE, as the high TC of the fibrous material 112 with nanomaterials may offset the low TC of matrix 114.

In various embodiments, surface 116 may be a smooth surface of bonding tool 100 (of FIG. 1) configured to accept and shape a fibrous material for placement in an autoclave with the surface 116 being made of a selected fibrous material 112 and matrix 114. The criteria for selecting a resin and/or fiber to form composite mold 102 of bonding tool 100 (of FIG. 1) may include a desired coefficient of thermal expansion and thermal conductivity. A typical hydrocarbon based resin may have a TC of 6 to 10 watts per meter Kelvin. The matrix 114 used to form composite mold 102 may have a TC greater than 10 watts per meter Kelvin. For example, matrix 114 may have a TC ranging from 20 to 50 watts per meter Kelvin. In various embodiments, the TC of matrix 114 may exceed 50 watts per meter Kelvin.

In various embodiments, matrix 114 characterized by high TC and low CTE may be formed from a predominantly hydrogen-unsaturated resin with closed ring geometry. In that regard, the resin may be made by reducing the amount of hydrogen present in the resin and/or replacing hydrogen with nitrogen or carbon based resins. The reduced hydrogen content in the resin may provide greater resistance to water damage and resulting delamination as well as a high TC (i.e., a resin with no hydrogen available for bonding). A matrix 114 having a low CTE may describe a resin having a lower CTE than silicon dioxide glass, for example.

In various embodiments, a matrix 114 formed from a resin having characteristics of (and/or comprising) a ceramic material such as SiAlON (named for the chemical symbols for silicon, aluminum, oxygen, and nitrogen) may be used to achieve a composite surface of bonding tool 100 (of FIG. 1) having a low CTE and high TC. SiAlON may be made from raw materials comprising silicon nitride, alumina, aluminum nitride, silica and the oxide of a rare earth element. SiAlON may further be used in combination with other compounds to form a matrix 114 having the desired TC and CTE. In that regard, SiAlON may be a high-thermal-conductivity ceramic deposited onto fibrous material 112. Deposition of a ceramic material, such as SiAlON, into or onto fibrous material 112 may be accomplished using chemical vapor infiltration, melt infiltration, and/or slurry casting, alone or in various combinations, to partially or fully impregnate fibrous material 112 with the ceramic material (i.e., matrix 114).

In various embodiments, phenol may be used to form a resin constituting matrix 114. Phenol may be particularly suitable for matrix 114 due to the hydroxyl group in phenol being attached to an unsaturated hydrocarbon ring (e.g., benzene). Phenol may be condensed with acetone to yield bisphenol-A, a precursor to polycarbonates and epoxide resins. Imidazole may also be used in forming matrix 114. In various embodiments, a combination of phenol and imidazole may be used to produce matrix 114 with a TC greater than 10 watts per meter Kelvin. Phenol and imidazole are intended as non-limiting examples of precursors to a resin constituting matrix 114 with closed-ring structure with a predominantly hydrogen unsaturated composition.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A composite bonding tool, comprising:
    a composite mold comprising:
        a fibrous material; and
        a matrix disposed about the fibrous material and cured, wherein the matrix comprises a thermal conductivity greater than 10 watts per meter Kelvin,
    wherein the fibrous material and the matrix form a layup surface of the composite mold, the layup surface being configured to directly contact and shape a part disposed on the composite mold.

2. The composite bonding tool of claim 1, wherein the matrix comprises the thermal conductivity from 20 to 50 watts per meter Kelvin.

3. The composite bonding tool of claim 1, wherein the fibrous material comprises a chopped fiber.

4. The composite bonding tool of claim 1, wherein the fibrous material comprises a metal coated fiber.

5. The composite bonding tool of claim 4, wherein the metal coated fiber is coated with a nickel-iron alloy.

6. The composite bonding tool of claim 1, further comprising a nanostructure disposed in the matrix.

7. The composite bonding tool of claim 6, wherein the nanostructure comprises at least one of carbon nanotubes, carbon nanofibers, or graphene nanoplatelets.

8. The composite bonding tool of claim 1, wherein the matrix comprises a hydrogen-unsaturated resin with closed ring geometry.

9. The composite bonding tool of claim 1, wherein the fibrous material is distributed isotropically within the matrix.

10. The composite bonding tool of claim 1, wherein the matrix comprises at least one of a high-thermal-conductivity ceramic or a resin formed using at least one of phenol or imidazole.

11. A composite bonding tool surface, comprising:
    a fibrous material; and
    a matrix disposed about and infiltrating the fibrous material, wherein the matrix comprises a thermal conductivity greater than 10 watts per meter Kelvin, wherein the composite bonding tool surface is configured to directly contact and shapes a part.

12. The composite bonding tool surface of claim 11, wherein the fibrous material comprises a metal coated fiber.

13. The composite bonding tool surface of claim 11, wherein the matrix comprises at least one of a high-thermal-conductivity ceramic or a resin formed using at least one of phenol or imidazole.

14. The composite bonding tool surface of claim 11, wherein the matrix comprises a lower coefficient of thermal expansion than glass.

15. The composite bonding tool surface of claim 11, wherein the thermal conductivity of the matrix is between 20 watts per meter Kelvin and 50 watts per meter Kelvin.

* * * * *